Dec. 17, 1935.  N. CHAMBERLIN  2,024,337
ANIMAL TRAP
Filed Jan. 30, 1935
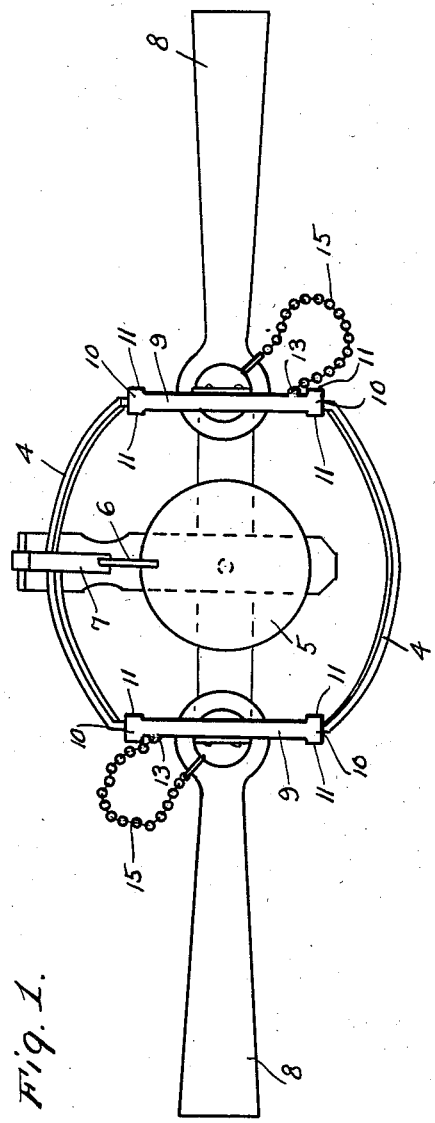
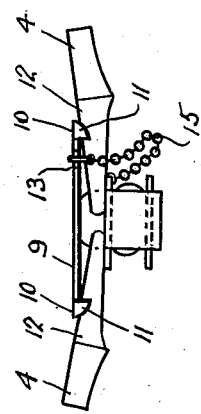
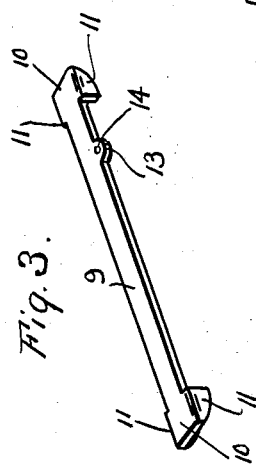
Inventor
N. Chamberlin
By Clarence A. O'Brien
Attorney Patented Dec. 17, 1935

2,024,337

UNITED STATES PATENT OFFICE 2,024,337

ANIMAL TRAP

Nat Chamberlin, Butte, Mont.

Application January 30, 1935, Serial No. 4,139

1 Claim. (Cl. 43—88)

My invention relates to an improvement in animal traps, and particularly to an attachment for traps used to catch foxes, coyotes and similar animals.

In order to catch these animals, it is necessary to cover the trap with dirt or sand to conceal the same from view. When the trap is sprung, dirt or sand lodges between the jaws at their base, thereby preventing free movement of the opposing jaws toward each other to effectively catch the animal.

I overcome the above disadvantage by attaining the principal object of my invention, which is to provide a trap, the jaws of which may at all times contact with each other.

Another object of my invention is to provide means whereby the base of the jaws are kept free from foreign material.

Other objects of the invention will be apparent from the following description of the present preferred form thereof, taken in connection with the accompanying drawing, wherein:

Figure 1 is a top plan view of a trap, with the attachment in place on the same.

Figure 2 is a fragmentary view of the trap, showing in detail the manner in which the attachment is connected to the jaws of the trap; and Figure 3 is a perspective of the attachment.

In the drawing, wherein for the purpose of illustration is shown a preferred embodiment of my invention, 4 designates the jaws of a conventional animal trap, which has the customary plate 5, trigger 6, catch 7 to hold the jaws in place, and springs 8 to constantly urge the jaws toward each other.

My improved attachment consists of a cover plate 9, the free ends 10 of which are wider than the intermediate section. These free ends 10 have ears 11 extending downwardly from the sides of the cover plate, said ears tapering toward the free ends 10 to permit the cover plate to securely straddle arms 12 of the jaws 4, and to thereby cover the same against the entrance of sand, dirt, leaves and other foreign material used to conceal the trap.

Adjacent one free end of the cover plate 9 is an extension 13, formed integral with said plate and having therein an opening 14 for the reception of one end of a chain 15. The other end of the chain is attached to the spring 8, thereby preventing the cover plate 9 from being separated from the trap when the plate is not in place on the jaws.

In use the trap is set and the cover plate 9 is attached to the adjacent arms of the jaws 4 of the trap, which is then entirely covered with dirt, sand, leaves and other foreign material to conceal the trap from view. When the trap is sprung, the movement of the jaws toward each other projects the cover plate 9 upwardly and away from the jaws, thereby leaving the arms of the jaws free from all foreign material to permit the jaws to effectively contact the animal.

Various changes may be made in my invention, especially in the details of construction, proportion and arrangement of parts thereof, within the scope of the appended claim.

What is claimed is:

In combination with an animal trap having opposing jaws, a cover for the adjacent arms of the jaws, said cover consisting of a strip of metal with depending ears on each side thereof and adjacent its free ends to permit the cover to straddle said adjacent arms.

NAT CHAMBERLIN.